United States Patent
Hayata et al.

(10) Patent No.: US 8,818,127 B2
(45) Date of Patent: Aug. 26, 2014

(54) IMAGE PROCESSING APPARATUS AND IMAGE PROCESSING METHOD

(75) Inventors: Keisuke Hayata, Kanagawa (JP); Hiroto Tomita, Fukuoka (JP); Tomoo Kimura, Fukuoka (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 57 days.

(21) Appl. No.: 13/819,766

(22) PCT Filed: Mar. 23, 2012

(86) PCT No.: PCT/JP2012/002044
§ 371 (c)(1),
(2), (4) Date: Feb. 28, 2013

(87) PCT Pub. No.: WO2012/137437
PCT Pub. Date: Oct. 11, 2012

(65) Prior Publication Data
US 2013/0156339 A1 Jun. 20, 2013

(30) Foreign Application Priority Data
Apr. 8, 2011 (JP) ................................. 2011-086736

(51) Int. Cl.
| | | |
|---|---|---|
| *G06K 9/40* | (2006.01) | |
| *H04N 5/232* | (2006.01) | |
| *G06T 5/00* | (2006.01) | |
| *H04N 13/00* | (2006.01) | |
| *G06T 5/50* | (2006.01) | |
| *G06K 9/36* | (2006.01) | |
| *H04N 13/02* | (2006.01) | |
| *H04N 5/235* | (2006.01) | |

(52) U.S. Cl.
CPC ......... *G06T 5/50* (2013.01); *G06T 2207/20192* (2013.01); *H04N 5/23229* (2013.01); *G06T 5/002* (2013.01); *H04N 13/0239* (2013.01); *G06T 2207/20221* (2013.01); *H04N 13/00* (2013.01); *G06T 2207/10012* (2013.01); *H04N 5/2355* (2013.01)
USPC .......................................... 382/268; 382/284

(58) Field of Classification Search
USPC ......... 382/128, 154, 218–220, 254, 268, 284; 348/43, E13.001; 345/419; 358/3.27
See application file for complete search history.

(56) References Cited

U.S. PATENT DOCUMENTS

| | | | | |
|---|---|---|---|---|
| 8,228,562 | B2* | 7/2012 | Kawabe | 358/3.27 |
| 8,463,019 | B2* | 6/2013 | Yamada et al. | 382/154 |

(Continued)

FOREIGN PATENT DOCUMENTS

| | | |
|---|---|---|
| JP | 2005-311725 A | 11/2005 |
| JP | 2007-324770 A | 12/2007 |
| JP | 2010-239493 A | 10/2010 |

OTHER PUBLICATIONS
International Search Report for PCT/JP2012-002044 dated Jun. 5, 2012.

*Primary Examiner* — Amir Alavi
(74) *Attorney, Agent, or Firm* — Pearne & Gordon LLP

(57) ABSTRACT

The picture quality of captured images can be improved with the degradation of clearness of image-captured object boundaries suppressed. An image processing apparatus (100) comprises: an image/distance acquiring unit (200) that acquires corresponding pixel pairs between left-eye and right-eye images, its depth information and its matching scores; a weight information calculating unit (300) that determines, for each of the pixel pairs, a weight of each of the pixels in a certain area including, as pixels of interest, the pixel pair on the basis of the depth information and the matching scores; and a pixel value superimposing unit (400) that applies, for each of the pixel pairs, the weight to the pixel values in the aforementioned certain area, thereby performing a smoothing process in at least one of the two images and that superimposes the two images using the values obtained by the smoothing process.

9 Claims, 9 Drawing Sheets

(56) References Cited

U.S. PATENT DOCUMENTS

2003/0156747 A1* 8/2003 Faber .......................... 382/128
2004/0051710 A1* 3/2004 Hara ........................... 345/419
2013/0156339 A1* 6/2013 Hayata et al. ................ 382/268

* cited by examiner

IMAGE PROCESSING APPARATUS AND IMAGE PROCESSING METHOD

This application is a 371 of PCT/JP2012/002044 filed on Mar. 23, 2012

TECHNICAL FIELD

The present invention relates to an image processing apparatus and an image processing method that combine a plurality of images to form a high-quality image.

BACKGROUND ART

A technique that forms a composite image from two photographed images of one object is known as a technique for improving the quality of a photographed image (for example, see Patent Literature 1).

In the technique described in Patent Literature 1 (hereinafter, referred to as "conventional technique"), a composite image is formed through superimposition of pixel values from a short-exposure image and the respective pixel values from a long-exposure image of one object for individual pixel pairs. In this operation, the conventional technique increases the percentage of the pixel value of the short-exposure image to adjust a blurring range of an edge of an object in the long-exposure image. The short-exposure image has many noises but has a clear edge. The long-exposure image has an unclear edge but has few noises. As a result, the conventional technique achieves formation of a composite image that exhibits both the advantages of the short-exposure image and the long-exposure image while doubling the total dynamic range over the pixel values.

CITATION LIST

Patent Literature

PTL 1
Japanese patent Application Laid-Open No. 2007-324770

SUMMARY OF INVENTION

Technical Problem

In the conventional technique, however, blurring of an object to be photographed occurs in the long-exposed image due to movement of an object and/or camera, and such blurring remains in a composite image, resulting in an unclear boundary of a photographed object. This is because the boundary of an object cannot be specified only from edge information, and computing such as combining may be performed over a range across the boundary.

An object of the invention is to provide an image processing apparatus and an image processing method that can reduce blurring of a boundary of a photographed object to expand a dynamic range and can form a photographed image with an improved quality.

Solution to Problem

An image processing apparatus of the present invention, which forms a composite image from two photographed images, includes an image/depth acquiring section that acquires corresponding pixel pairs between the two images, and depth information and a matching score of every corresponding pixel pair, a weight information calculating section that determines weights for individual pixels in a predetermined region including a corresponding pixel pair as a pixel of interest on the basis of the depth information and the matching score of every corresponding pixel pair, and a pixel-value superimposing section that applies the weight to every corresponding pixel pair in the predetermined region for smoothing, replaces the pixel value of the pixel of interest in the predetermined region with the value determined through the smoothing, and superimposes the two images for every pixel, in at least one of the two images.

An image processing method according to the present invention, which forms a composite image from two photographed images, includes the steps of acquiring corresponding pixel pairs between the two images, and depth information and a matching score of every corresponding pixel pair; determining weights for individual pixels in a predetermined region including a corresponding pixel pair as a pixel of interest on the basis of the depth information and the matching score of every corresponding pixel pair; and applying the weight to a pixel value in the predetermined region for smoothing for every corresponding pixel pair, replacing the pixel value of the pixel of interest in the predetermined region with the value determined through the smoothing, and superimposing the two images for every pixel, in at least one of the two images.

Advantageous Effects of Invention

According to the invention, blurring can be reduced at boundaries of a photographed object while a dynamic range is expanded. Such advantages contribute to an improvement in quality of photographed images.

DESCRIPTION OF EMBODIMENTS

Embodiments of the present invention will now be described in detail with reference to the accompanying drawings.

Embodiment 1

Embodiment 1 of the present invention is an example of the basic embodiments of the present invention.

Figure 1:
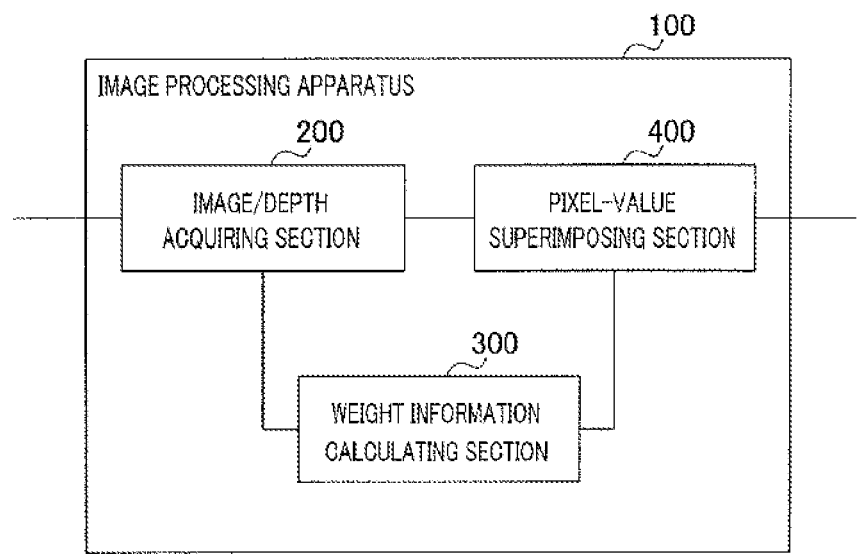
FIG. 1 is a block diagram illustrating a configuration of an image processing apparatus according to Embodiment 1 of the invention.

FIG. 1 is a block diagram illustrating a configuration of an image processing apparatus according to Embodiment 1.

In FIG. 1, image processing apparatus 100 forms a composite image from two simultaneously photographed images.

Image processing apparatus 100 includes image/depth acquiring section 200, weight information calculating section 300, and pixel-value superimposing section 400.

Image/depth acquiring section 200 acquires corresponding pixel pairs between two simultaneously photographed images, and the depth information and matching score of every corresponding pixel pair. The corresponding pixel pair refers to a set of a pixel of one image and a pixel of the other image, the pixels presumably representing images of the same position (the same point). The depth information indicates an estimated depth (hereinafter, simply referred to as "depth") which indicates a distance from the stereo camera used for stereo photographing to the object (point) photographed on a pixel. The matching score refers to a value indicating identity in the object or background between a pixel of one image and a pixel of the other image.

Weight information calculating section 300 determines the weight for individual pixels within a predetermined region including the corresponding pixel pair as a pixel of interest on the basis of the depth information and the matching score of each corresponding pixel pair.

Pixel-value superimposing section 400 applies a weight to a pixel value in the predetermined region for each corresponding pixel pair in at least one of the two images for smoothing (weighted addition). In addition, pixel-value superimposing section 400 replaces the pixel value of the pixel of interest in the predetermined region with the smoothed value, and superimposes (adds) the two images for every pixel.

Image processing apparatus 100 includes, for example, CPU (central processing unit), a storage medium such as ROM (read only memory) storing a control program, and a working memory such as RAM (random access memory). In this configuration, the sections function in cooperation with hardware through execution of the control program by the CPU.

Such image processing apparatus 100 forms a composite image from two simultaneously photographed images. Moreover, image processing apparatus 100 superimposes values determined through smoothing of pixel values of each corresponding pixel pair in a predetermined region to form a composite image. Moreover, image processing apparatus 100 applies the weight determined on the basis of the depth information to each pixel prior to such smoothing.

In this way, image processing apparatus 100 uses the depth information, thus achieving the formation of a composite image after smoothing for removal of noise while isolating the interior and the exterior of an edge of an object having a different depth. Specifically, image processing apparatus 100 reduces blurring of a boundary of a photographed object to expand the dynamic range, achieving an improvement in quality of a photographed image.

Image processing apparatus 100 according to Embodiment 1 can be applied to, for example, a stereo camera, which enables simultaneous photographing of two images without displacement of a subject due to movement, thus eliminating a need for a special image photographing accessary. Specifically, image processing apparatus 100 achieves the above-described advantageous effect, i.e., the expansion of a dynamic range while reducing blurring of a boundary through slight modification of an existing stereo camera.

Embodiment 2

Embodiment 2 of the present invention is an application example of the image processing apparatus according to the invention to a photographic system that takes photographs with a stereo camera, as a specific embodiment of the invention.

An image processing apparatus according to Embodiment 2 and a photographic system including the image processing apparatus are now described.

Figure 2:
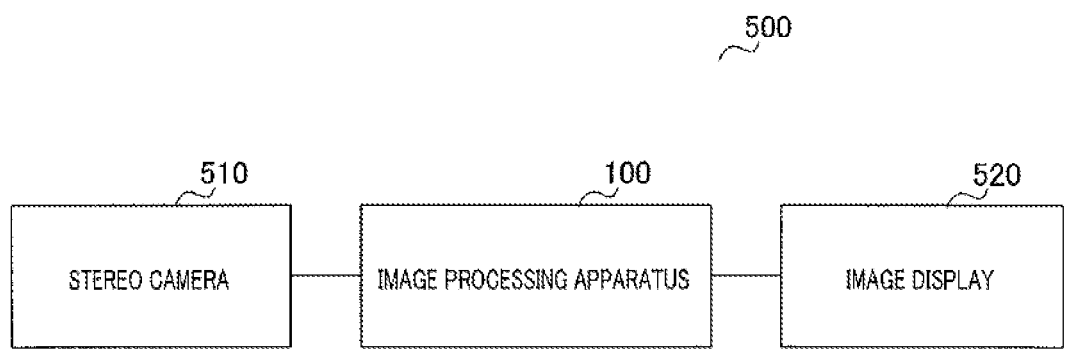
FIG. 2 is a system block diagram illustrating a configuration of a photographic system including an image processing apparatus according to Embodiment 2 of the invention.

FIG. 2 is a system block diagram illustrating the configuration of a photographic system including the image processing apparatus according to Embodiment 2 of the invention.

In FIG. 2, photographic system 500 includes stereo camera 510, image processing apparatus 100, and image display 520.

Stereo camera 510 simultaneously acquires a left-eye image and a right-eye image (hereinafter, appropriately referred to as "stereo image") through stereo photographing, and outputs the acquired stereo image to image processing apparatus 100 through cable or wireless communication. Stereo camera 510 is, for example, a stereo digital video camcorder including an image sensor such as CMOS (complementary metal oxide semiconductor) sensor.

Image processing apparatus 100 applies a weight to a pixel value for smoothing in a predetermined region (hereinafter, referred to as "work range") including corresponding pixel pairs of a stereo image for every corresponding pixel pair in at least one of received left-eye and right-eye images. Image processing apparatus 100 then replaces the pixel value of the pixel of interest in that work range with the smoothed value, and superimposes (adds) the left-eye image and the right-eye image for every pixel. In this operation, image processing apparatus 100 weights each pixel within the work range on the basis of depth information of the pixel. The pixel values to be superimposed are, for example, luminance values in each color. Image processing apparatus 100 defines the resultant value from such superimposition as a new pixel value for each corresponding pixel pair to form a composite image. Image processing apparatus 100 then outputs the resultant composite image to image display 520 through cable communication, wireless communication, or transmission via a removable information recording medium.

Image display 520 displays the received composite image on its screen. Image display 520 is, for example, a liquid crystal display.

Such photographic system 500 can take a stereo image while forming a composite image with an improved quality from the resultant stereo image, and displaying the composite image.

In Embodiment 2, photographic system 500 forms a composite image with a left-eye image as a reference image.

Figure 3:
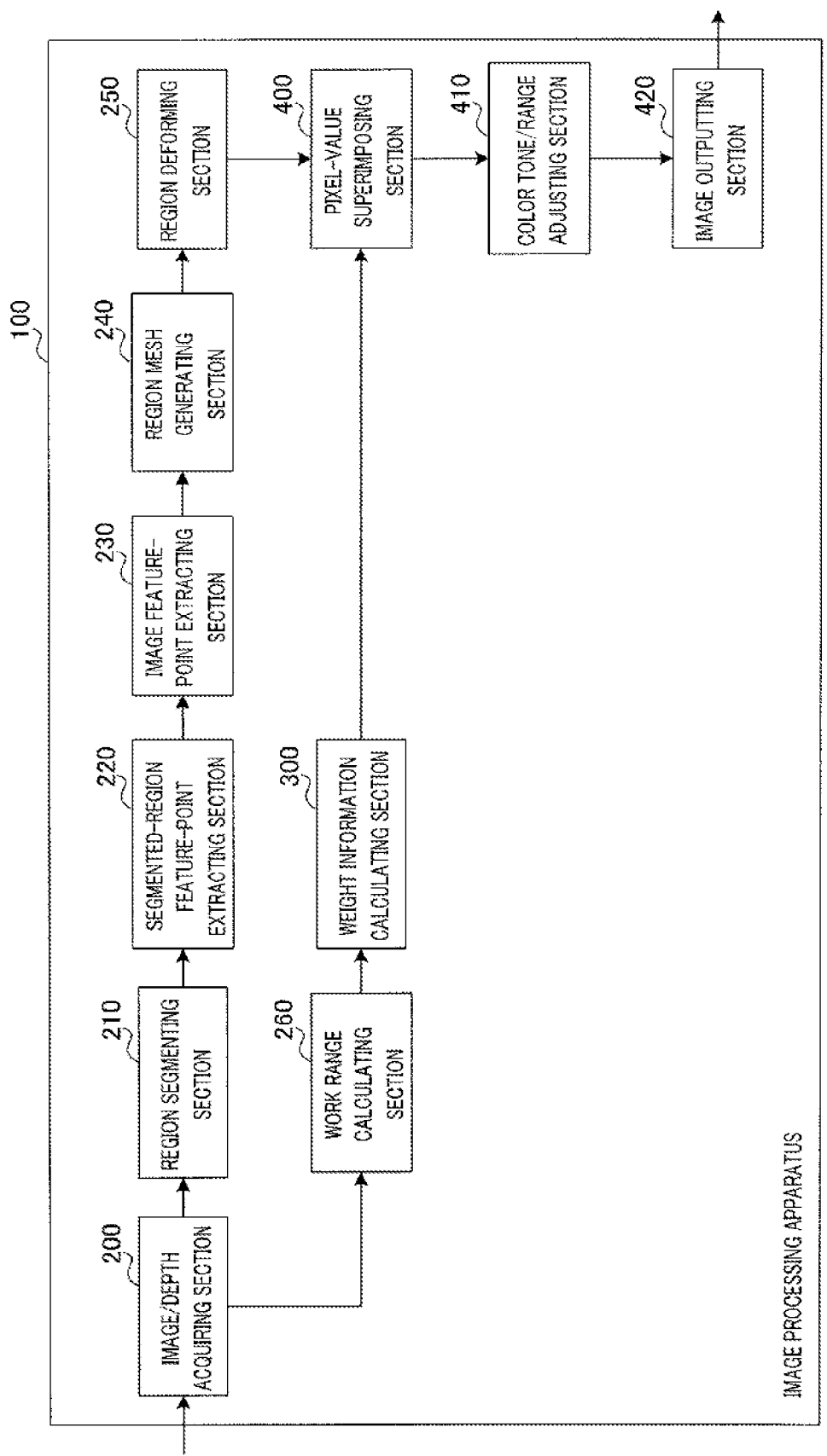
FIG. 3 is a block diagram illustrating an exemplary configuration of the image processing apparatus according to Embodiment 2 of the invention.

FIG. 3 is a block diagram illustrating an exemplary configuration of image processing apparatus 100.

In FIG. 3, image processing apparatus 100 includes image/depth acquiring section 200, region segmenting section 210, segmented-region feature-point extracting section 220, image feature-point extracting section 230, region mesh generating section 240, region deforming section 250, work range calculating section 260, weight information calculating section 300, pixel-value superimposing section 400, color tone/Range adjusting section 410, and image outputting section 420.

Image/depth acquiring section 200 acquires a stereo image from stereo camera 510 (see FIG. 2). Image/depth acquiring section 200 then acquires the corresponding pixel pairs of the stereo image, the depth information, and the matching scores for all pixels of the left-eye image.

Specifically, for example, image/depth acquiring section 200 performs image matching between the left-eye image and the right-eye image, and calculates the matching score of every combination of pixels of the left-eye image and pixels of the right-eye image. The matching score refers to a value indicating identity in the object or background between a pixel of the left-eye image and a pixel of the right-eye image. For example, in an approach for image matching, the respective images are divided into blocks, and the degree of coincidence between the blocks is obtained. In this approach, such values based on the degree of coincidence can be used as the matching scores.

Examples of the approach for evaluating the degree of coincidence between blocks include sum of absolute difference (SAD) of luminance, sum of squared difference (SSD) of luminance values, and normalized cross-correlation (NCC).

For example, SAD is represented by $M(x_L, x_R)$ according to equation 1, where (xL, xL) and (xR, xR) represent the coordinates of a corresponding pixel pair in a left-eye image and a right-eye image, respectively. $I_L$ the pixel value (for example, a luminance value) of the corresponding pixel pair in the left-eye image. $I_R$ represents the pixel value (for example, a luminance value) of the corresponding pixel pair in the right-eye image.

(Equation 1)

$$M(x_L, x_R) = \sum_{i=-I}^{I} \sum_{j=-J}^{J} |I_L(x_L + i, y_L + j) - I_R(x_R + i, y_R + j)| \quad [1]$$

Similarly, for example, SSD is represented by $M(x_L, x_R)$ according to equation 2.

(Equation 2)

$$M(x_L, x_R) = \sum_{i=-I}^{I} \sum_{j=-J}^{J} (I_L(x_L + i, y_L + j) - I_R(x_R + i, y_R + j))^2 \quad [2]$$

In addition, for example, SSD is represented by $M(x_L, x_R)$ according to equations 3 to 5.

(Equation 3)

$$M(x_L, x_R) = \frac{\sum_{i=-I}^{I} \sum_{j=-J}^{J} (I_L(x_L + i, y_L + j) - I_R(x_R + i, y_R + j))^2}{\sqrt{\sum_{i=-I}^{I} \sum_{j=-J}^{J} (I_L(x_L + i, y_L + j) - \hat{I}_L(x_L, y_L))^2} \sqrt{\sum_{i=-I}^{I} \sum_{j=-J}^{J} (I_R(x_R + i, y_R + j) - \hat{I}_R(x_R, y_R))^2}} \quad [3]$$

(Equation 4)

$$\hat{I}_L(x_L, y_L) = \frac{1}{(2I+1)(2J+1)} \sum_{i=-I}^{I} \sum_{j=-J}^{J} I_L(x_L + i, y_L + j) \quad [4]$$

(Equation 5)

$$\hat{I}_R(x_R, y_R) = \frac{1}{(2I+1)(2J+1)} \sum_{i=-I}^{I} \sum_{j=-J}^{J} I_R(x_R + i, y_R + j) \quad [5]$$

In the SAD and SSD approaches, the evaluated value is a positive value, and the degree of coincidence increases as the value decreases. Hence, the matching score can be represented by a function having a higher value with a smaller evaluated value, such as the reciprocal of an evaluated value, or the value obtained by subtracting the evaluated value from a constant. In NCC, an evaluated value ranges from 1 to −1, where the degree of coincidence is highest at 1. Hence, the evaluated value can be directly used as the matching score. It will be appreciated that the matching score can be represented as a value expressed by a function in which the weight increases with a higher evaluated value, for example, the cubic value of an evaluated value.

Image/depth acquiring section 200 then selects a pixel having the highest matching score in the right-eye image for every pixel of the left-eye image, and determines a set of pixels including the selected pixel as a corresponding pixel pair.

Image/depth acquiring section 200 then calculates the depth of a pixel of each corresponding pixel pair to an object photographed in the pixel with a stereo method. In the stereo method, the depth to a point photographed by each pixel is calculated on the basis of parallax between pixels in accordance with the principle of triangulation using the installation parameter of stereo camera 510.

Image/depth acquiring section 200 then outputs the left-eye image, the right-eye image, and information on the position of a pixel of the right-eye image (hereinafter, referred to as "corresponding pixel pair information), the pixel forming a corresponding pixel pair with each pixel of the left-eye image, and the depth information of each pixel of the left-eye image to region segmenting section 210. Moreover, image/depth acquiring section 200 outputs the matching score and the depth information of each pixel of the left-eye image to work range calculating section 260. Image/depth acquiring section 200 may output a left-eye image additionally provided with the depth information of each pixel as a left-eye depth image.

Region segmenting section 210 acquires corresponding segmented-region pairs between the left-eye image and the right-eye image from the received left-eye and right-eye images. The corresponding segmented-region pair refers to a set of a left-eye image region and a right-eye image region, the left-eye image region and the right-eye image region presumably representing the same object or background.

Specifically, for example, region segmenting section 210 segments the left-eye image by a consecutive image region, in which the difference in depth between pixels is within a predetermined range, on the basis of the depth information. Alternatively, region segmenting section 210 may detect an image of an object on the basis of another type of information such as a color or an edge, and may segment the left-eye image by such an object image. Region segmenting section 210 selects a right-eye segmented image corresponding to each of the left-eye segmented images obtained from the left-eye image in the right-eye image on the basis of the corresponding pixel-pair information. Region segmenting section 210 then defines the left-eye segmented images and the right-eye segmented images as corresponding segmented-region pairs.

Region segmenting section 210 then outputs the left-eye image, the right-eye image, the corresponding pixel-pair information, and information on a range of each left-eye segmented image (hereinafter, referred to as "left-eye segmented-image information") to segmented-region feature-point extracting section 220.

The set of the corresponding pixel-pair information and the left-eye segmented-image information indicates the counterpart (right-eye segmented image) of the corresponding segmented-region pair of each left-eye segmented image. In other words, region segmenting section 210 outputs corresponding segmented-region pairs as sets of the left-eye segmented images and the right-eye segmented images to segmented-region feature-point extracting section 220.

Segmented-region feature-point extracting section 220 extracts a plurality of corresponding contour feature-point pairs in each of the received corresponding segmented-region pairs. The corresponding contour feature-point pair is a set of a feature point of the contour of a left-eye segmented image (hereinafter, referred to as "left-eye contour feature point") and a feature point of the contour of a right-eye segmented image (hereinafter, referred to as "right-eye contour feature point"), the feature points presumably representing the same position (point).

Specifically, for example, segmented-region feature-point extracting section 220 extracts corners of the contour of a left-eye segmented image or dots arranged at a fixed interval on the contour as the left-eye contour feature points from the left-eye segmented image.

Segmented-region feature-point extracting section 220 then outputs the left-eye image, the right-eye image, the corresponding pixel-pair information, the left-eye segmented-image information, and the left-eye contour feature points to image feature-point extracting section 230.

The set of the corresponding pixel-pair information and the left-eye contour feature points indicates the counterpart (right-eye contour feature points) of the corresponding contour feature-point pair with the left-eye contour feature points. In addition, as described above, the set of the corresponding pixel-pair information and the left-eye segmented-image information indicates corresponding segmented-region pairs. In other words, segmented-region feature-point extracting section 220 outputs the corresponding contour feature-point pairs as sets of the left-eye contour feature points and the right-eye contour feature points, and the corresponding segmented-region pairs to image feature-point extracting section 230.

Image feature-point extracting section 230 extracts one or more corresponding image feature-point pairs from each received corresponding segmented-region pair. The corresponding image feature-point pair is a set of a feature point in the inside of a left-eye segmented image (hereinafter, referred to as "left-eye image feature point") and a feature point in the inside of a right-eye segmented image (hereinafter, referred to as "right-eye image feature point"), the feature points presumably representing the same position.

Specifically, for example, image feature-point extracting section 230 extracts from the left-eye segmented image a distinctively shaped portion such as a corner of an object, and/or a point having a high matching score as the left-eye image feature point. Examples of the approach for extracting the feature point include Harris Corner Detector.

Image feature-point extracting section 230 then outputs the left-eye image, the right-eye image, the corresponding pixel-pair information, the left-eye segmented-image information, the left-eye contour feature points, and the left-eye image feature points to image feature-point extracting section 230.

The set of the corresponding pixel-pair information and the left-eye image feature points indicates the counterpart (right-eye image feature points) of the corresponding image feature-point pair with the left-eye image feature points. In addition, as described above, the set of the corresponding pixel-pair information and the left-eye segmented-image information indicates the corresponding segmented-region pairs, and the set of the corresponding pixel-pair information and the left-eye contour feature points indicates the corresponding contour feature-point pairs. In other words, image feature-point extracting section 230 outputs the corresponding image feature-point pair as the set of the left-eye image feature points and the right-eye image feature points, the corresponding segmented-region pairs, and the corresponding contour feature-point pairs to region mesh generating section 240.

Region mesh generating section 240 segments each of the left-eye image and the right-eye image into small regions (into a mesh or polygon pattern). Specifically, region mesh generating section 240 segments each of the left-eye image and the right-eye image into small regions on the basis of the received corresponding segmented-region pairs and corresponding contour feature-point pairs, and the points at the four corners of the left-eye image (hereinafter, generally referred to as "feature points"). The small segmented regions are referred to as left-eye mesh regions and right-eye mesh regions. Region mesh generating section 240 then extracts the corresponding image region pair from the small segmented regions. The corresponding image region pair refers to a set of the left-eye mesh region and the right-eye mesh region, the left-eye mesh region and the right-eye mesh region presumably representing images in the same range.

Specifically, for example, region mesh generating section 240 connects the left-eye contour feature point and the left-eye image feature point of a left-eye segmented image with a straight line, and extracts the left-eye mesh region delimited by the straight line or a boundary line. Examples of the approach for such mesh generation include Delaunay Triangulation.

Region mesh generating section 240 then outputs the left-eye image, the right-eye image, the corresponding pixel-pair information, and information on the extracted left-eye mesh regions (hereinafter, referred to as "left-eye mesh region information") to region deforming section 250.

The set of the corresponding pixel-pair information and the left-eye mesh region information indicates the counterpart (right-eye mesh region) of the corresponding segmented-region pair for each left-eye mesh region. In other words, region mesh generating section 240 outputs the corresponding image region pairs to region deforming section 250.

Region deforming section 250 matches the shapes of the regions of the composite image with each other for every received corresponding image region pair.

Specifically, for example, region deforming section 250 deforms the outline of each right-eye mesh region to match to the outline of the corresponding left-eye mesh region. Examples of the approach for deforming the region include affine transformation. Region deforming section 250 then combines the deformed right-eye mesh regions into a deformed right-eye image.

Region deforming section 250 then outputs the left-eye image, the deformed right-eye image, information on the corresponding pixel pairs between the left-eye image and the deformed right-eye image (hereinafter, referred to as "deformed corresponding pixel pairs") to pixel-value superimposing section 400. The information on the deformed corresponding pixel pairs represents positions of the pixels of the composite image.

Work range calculating section 260 determines the work range such that the work range is wider with a decrease in matching score of a received pixel of the left-eye image (corresponding pixel pair). In this operation, work range calculating section 260 defines a toroidal region centering on a pixel of interest as the work range.

Specifically, for example, work range calculating section 260 preliminarily stores information containing the size of a square work range about the pixel of interest (hereinafter, referred to as "work range size"), the work range size being associated with the matching score. Work range calculating section 260 determines the work range size corresponding to the matching score using the work-range size information for every pixel of the left-eye image.

Work range calculating section 260 then outputs the matching score, the depth information, and the acquired work range size of each pixel of the left-eye image to weight information calculating section 300.

Figure 4:
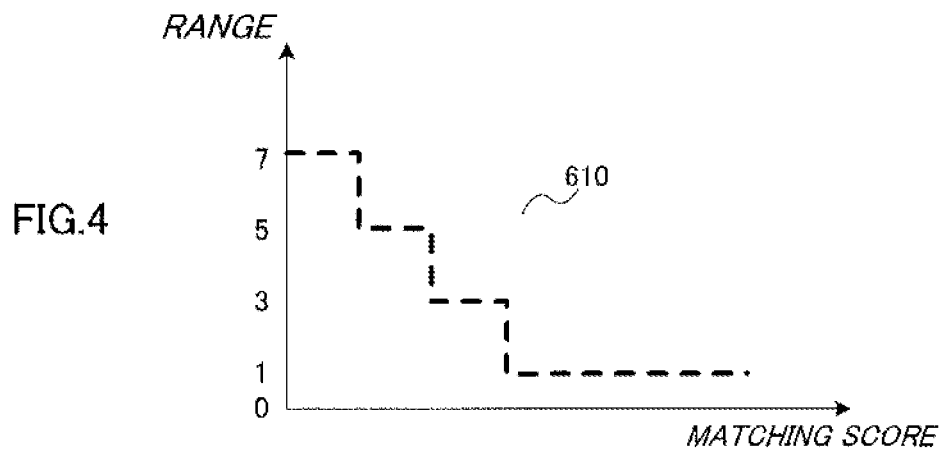
FIG. 4 is a diagram illustrating an exemplary content of work-range size information in Embodiment 2 of the invention.

FIG. 4 is a diagram illustrating exemplary contents of the work-range size information. In FIG. 4, the horizontal axis represents the matching score, while the vertical axis represents the work range size by the number of pixels per side of the square (hereinafter, referred to as "Range").

As illustrated in FIG. 4, for example, a high matching score is associated with Range "1" in work-range size information 610. This indicates that a pixel having a high matching score is used alone without smoothing with other pixels. In work-range size information 610, a lower matching score is associated with a higher Range, i.e., "3", "5" .... This means that the lower matching score of a pixel leads to smoothing with the pixels other than the pixel of interest (hereinafter, referred to as "peripheral pixels") within a wider work range. This is because a low matching score indicates a poor matching of a pixel of the right-eye image to the pixel of interest.

For example, Range "3" corresponds to the work range size covering 3×3 pixels about the pixel of interest. The number of pixels in the work range is thus 9.

Weight information calculating section 300 in FIG. 3 weights each received pixel (each corresponding pixel pair) of the left-eye image in the work range on the basis of the depth information. In this operation, weight information calculating section 300 less weights the pixel of interest and peripheral pixels in the work range as difference between depth indicated by the depth information of a pixel and depth indicated by the depth information of the pixel of interest (hereinafter, referred to as "difference in depth") increases.

Specifically, for example, weight information calculating section 300 preliminarily stores weighting information on every depth of the pixel of interest. The weighting information contains a weight and a threshold at the weight of 0 in association with the difference in depth. Weight information calculating section 300 determines the weight corresponding to the difference in depth of each peripheral pixel of the left-eye image using the weighting information.

Weight information calculating section 300 then outputs the matching score and the work range size of each pixel of the left-eye image, and the determined weight of each peripheral pixel as the unsmoothed weight to pixel-value superimposing section 400.

Figure 5:
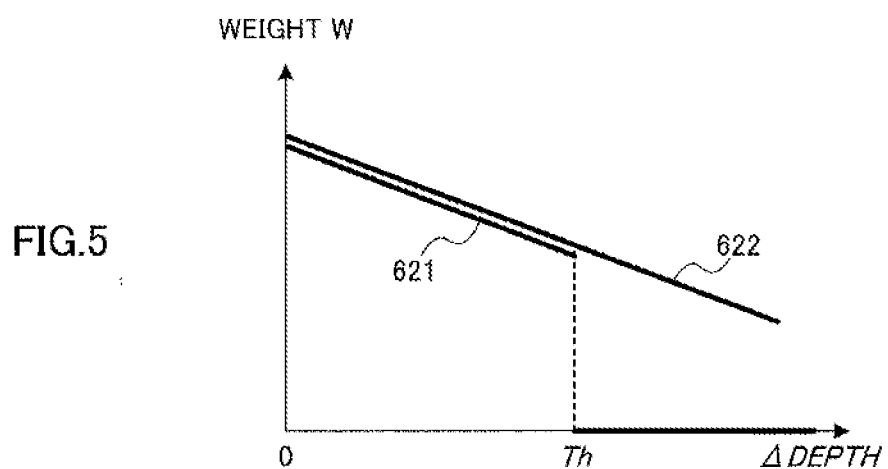
FIG. 5 is a first diagram illustrating exemplary contents of weighting information in Embodiment 2 of the invention.

FIG. 5 is a first diagram illustrating exemplary contents of the weighting information. In FIG. 5, the horizontal axis represents the difference in depth (ΔDepth), while the vertical axis represents the weight.

In FIG. 5, a larger difference in depth is linearly less weighted, as shown by first example weighting information 621. In first example 621 of the weighting information, a difference in depth equal to or larger than threshold Th is weighted with "0". Threshold Th, however, is not essential as illustrated in second example weighting information 622.

Figure 6:
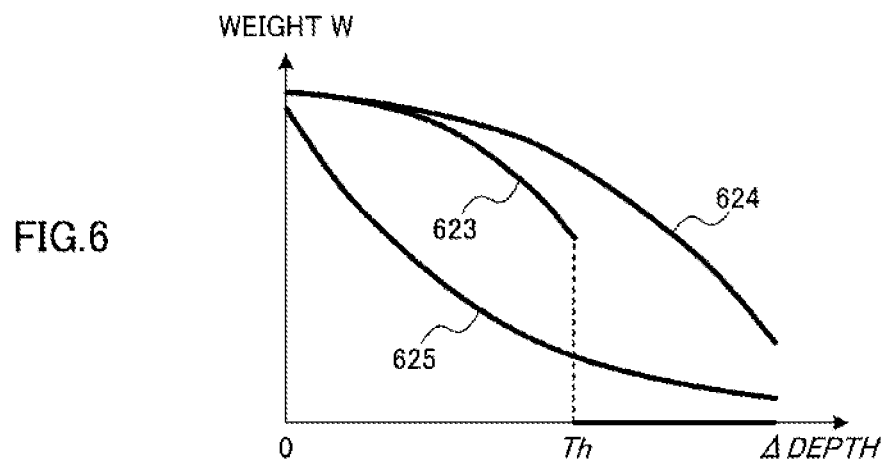
FIG. 6 is a second diagram illustrating exemplary contents of weighting information in Embodiment 2 of the invention.

FIG. 6, which corresponds to FIG. 5, is a second diagram illustrating exemplary contents of the weighting information.

As illustrated in FIG. 6, third example weighting information 623 represents the difference in depth that is nonlinearly weighted in an upward convex (quadratic curve) manner, having threshold Th. Threshold Th, however, is not essential as illustrated in fourth example 624 of the weighting information. Fifth example weighting information 625 represents the difference in depth that is nonlinearly weighted in a downward convex (quadratic curve) manner.

As in third and fourth example weighting information 623 and 624, the upward convex curve represents that the difference in depth is less significant in the calculation of weight information, which is similar to calculation of the average over the entire work range, and thus, noises are effectively reduced. In contrast, the downward convex curve of fifth example weighting information 625 represents that a smaller difference in depth is weighted higher. In such a case, the effect of noise reduction is relatively small, while the effect of holding a clear edge is relatively high.

Threshold Th preferably has a lower value with a decrease in depth of the pixel of interest. This is because a nearer subject causes larger parallax that leads to a relatively smaller difference in depth for the number of pixels corresponding to the parallax.

Storing the weighting information on every depth of the pixel of interest in weight information calculating section 300 is not essential in the case without threshold Th, or in the ease where threshold Th is set to a fixed value. Moreover, weight information calculating section 300 may use a plurality of pieces of weighting information in response to other information, such as user settings or environmental information.

Pixel-value superimposing section 400 in FIG. 3 applies a weight of each corresponding pixel pair to the pixel value in the work range of the deformed right-eye image for smoothing. Pixel-value superimposing section 400 then replaces the pixel value of the pixel of interest in the work range with the smoothed pixel value, and superimposes the left-eye image and the deformed right-eye image.

Specifically, pixel-value superimposing section 400 normalizes the received unsmoothed weights such that the sum total of weights is constant (for example, 1) in every work range (at every deformed corresponding pixel pair).

Pixel-value superimposing section 400 then calculates a value obtained by multiplying each pixel value of the deformed right-eye image by the normalized weight of each pixel in every work range (every deformed corresponding pixel pair). Pixel-value superimposing section 400 defines a value determined through smoothing of the product sum of the pixel values as a pixel value of each pixel of the deformed right-eye image (hereinafter, referred to as "smoothed pixel value") in each work range (for each deformed corresponding pixel pair). The smoothing may utilize, for example, the total value (the weighting value) of the multiplied values within the work range.

Pixel-value superimposing section 400 then superimposes the pixel value of the left-eye image and the smoothed pixel value of each deformed corresponding pixel pair of the deformed right-eye image. Pixel-value superimposing section 400 then defines the superimposed values as the pixel values of the composite image. Pixel-value superimposing section 400 superimposes the pixel values through multiplication of the pixel value of the left-eye image by a weight, multiplication of the smoothed pixel value of the deformed right-eye image by another weight, the total value of the weights (each being referred to as "image weight" hereinafter) being 1, and addition of such multiplied values.

Pixel-value superimposing section 400 then calculates the pixel values of all the pixels (deformed corresponding pixel pairs) of the left-eye image, and then outputs the data of the pixels in association with the pixel values as the composite image to color tone/Range adjusting section 410.

Color tone/Range adjusting section 410 performs predetermined image processing of the received composite image, the image processing including correction of a color tone, adjustment of the Range of the pixel value, and noise removal processing using a smoothing filter such as a bilateral filter. Color tone/Range adjusting section 410 then outputs the processed composite image to image outputting section 420.

Image outputting section 420 outputs the received processed composite image to image display 520.

Image processing apparatus 100 includes, for example, CPU, a storage medium such as ROM storing a control program, and a working memory such as RAM. In this configuration, the sections function in cooperation with hardware through execution of the control program by the CPU.

Such image processing apparatus 100 superimposes the smoothed pixel values of every corresponding pixel pair in the work range. The smoothing of the pixel values provides the same effect as noise reduction by binning. Specifically, image processing apparatus 100 can form a composite image with reduced noise while substantially doubling the dynamic range over the pixel values.

Image processing apparatus 100 according to Embodiment 2 applies the weight determined on the basis of the depth information to each pixel prior to the smoothing.

If the pixel of interest corresponds to a boundary of a photographed object, the work range for the pixel includes both the interior and the exterior of the boundary of the photographed object. In such a case, uniform smoothing in the work range regardless of interiority or exteriority of the pixel of interest with respect to the boundary of the photographed object results in the composite image having a blurred boundary of the photographed object.

Thus, image processing apparatus 100 uses the depth information that generally contains a difference in depth between a certain object (the foreground) and the background of the object to weight the interior and the exterior of the boundary of the photographed object separately. Consequently, image processing apparatus 100 can form a composite image including a clear boundary image of a photographed object.

Moreover, image processing apparatus 100 assigns a low matching score to a portion that is photographed by the left-eye image, but is not photographed by the right-eye image due to, for example, shading (occlusion). Image processing apparatus 100 then assigns a relatively wide work range to a pixel having such a low matching score to complement the composite image with the peripheral pixels. Consequently, image processing apparatus 100 can form a composite image with reduced differences from an actual image.

Moreover, image processing apparatus 100 deforms each mesh region of the right-eye image in accordance with the left-eye image before the superimposition. Furthermore, image processing apparatus 100 performs the weighting to smooth the right-eye image in every work range prior to the superimposition. Consequently, image processing apparatus 100 can form the composite image while reducing the occlusion of the portion that is not photographed by the left-eye image.

Specifically, image processing apparatus 100 according to Embodiment 2 can reduce blurring of the boundary of the photographed object, and thus can improve quality of the photographed image compared with the conventional technique.

In addition, image processing apparatus 100 according to Embodiment 2 generally forms the composite image from the stereo image simultaneously photographed, thus eliminating a need for long-exposure of image as in the conventional technique. This also allows image processing apparatus 100 to provide a photographed image of high quality in spite of the movement of a subject and/or a camera and variations in ambient environment such as light.

Each section of image processing apparatus 100 may store the acquired information in a common information storing section instead of sequentially outputting the information to the section in the subsequent stage. In such a case, each section acquires the necessary information with reference to the information storing section.

The description of the configuration of image processing apparatus 100 and photographic system 500 is now completed.

Operation of image processing apparatus 100 is now described.

Figure 7:
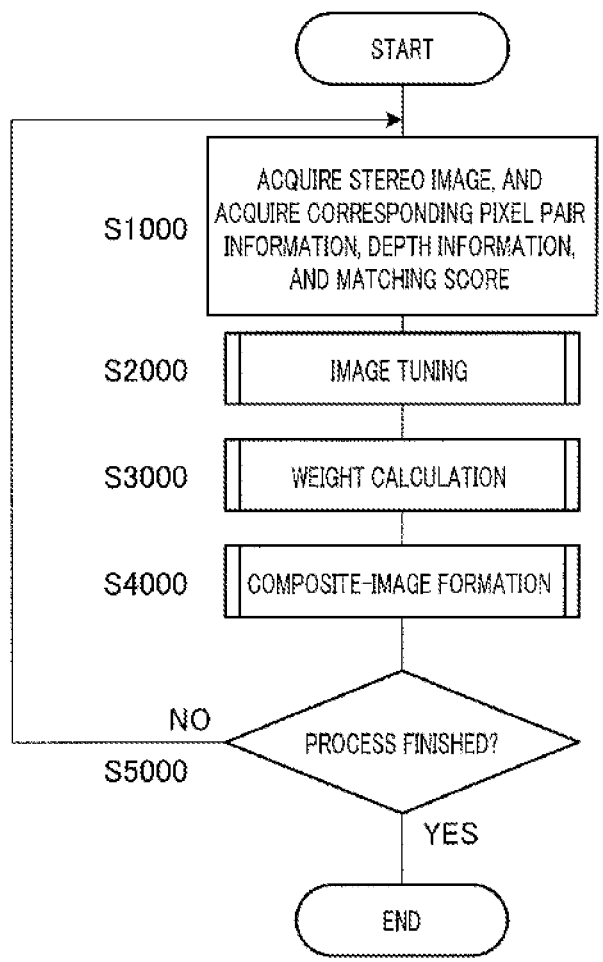
FIG. 7 is a flowchart illustrating exemplary operation of the image processing apparatus according to Embodiment 2 of the invention.

FIG. 7 is a flowchart illustrating exemplary operation of image processing apparatus 100.

In step S1000, image/depth acquiring section 200 acquires a stereo image from stereo camera 510 (see FIG. 2). Image/depth acquiring section 200 then acquires the corresponding pixel pair information, the depth information, and the matching scores of all the pixels of the left-eye image as a reference image from the stereo image.

In step S2000, region segmenting section 210 to region deforming section 250 perform image tuning for deforming the right-eye image in accordance with the left-eye image.

In step S3000, work range calculating section 260 and weight information calculating section 300 perform weight calculation to determine the normalized weight.

Work range calculating section 260 and weight information calculating section 300 may perform step S3000 before step S2000.

In step S4000, pixel-value superimposing section 400 to image outputting section 420 form a composite-image through superimposition of the left-eye image and the deformed right-eye image.

In step S5000, image/depth acquiring section 200 determines whether the composite-image formation is finished by, for example, instruction from the user. If the process is not to be finished (S5000: NO), linage/depth acquiring section 200 performs step S1000; otherwise (S5000: YES), image/depth acquiring section 200 finishes the series of steps.

Figure 8:
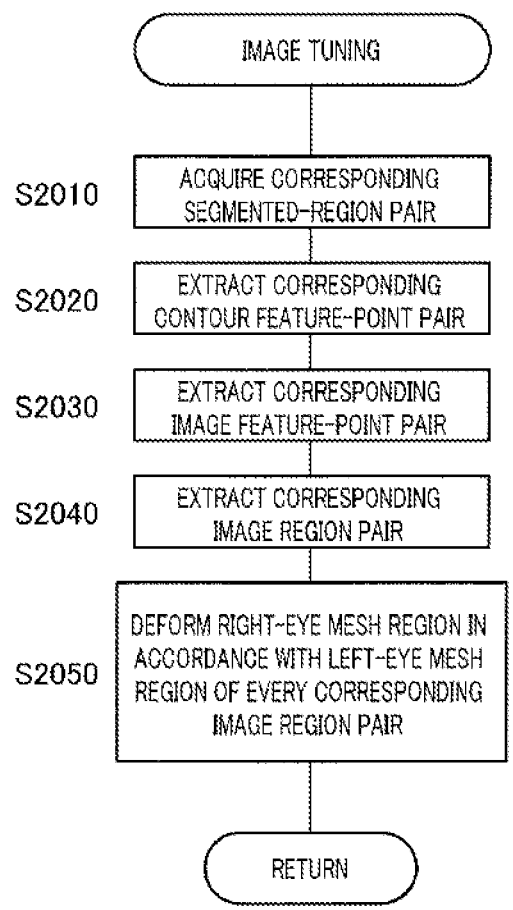
FIG. 8 is a flowchart illustrating exemplary image tuning in Embodiment 2 of the invention.

FIG. 8 is a flowchart illustrating exemplary image tuning (step S2000 in FIG. 7).

In step S2010, region segmenting section 210 segments each of the left-eye image and the right-eye image into regions to provide the corresponding segmented-region pairs (the left-eye segmented-images and the right-eye segmented-images).

In step S2020, segmented-region feature-point extracting section 220 extracts the corresponding contour feature-point pair (the left-eye contour feature point and the right-eye contour feature point) from each corresponding segmented-region.

In step S2030, image feature-point extracting section 230 extracts the corresponding image feature-point pair (the left-eye image feature point and the right-eye image feature point) from every corresponding segmented-region pair.

In step S2040, region mesh generating section 240 extracts the corresponding image region pairs (the left-eye mesh regions and the right-eye mesh regions) on the basis of the feature points.

In step S2050, region deforming section 250 deforms the right-eye mesh region in accordance with the left-eye mesh region for every corresponding image region pair to form the deformed right-eye image, and performs the steps of FIG. 7.

Figure 9:
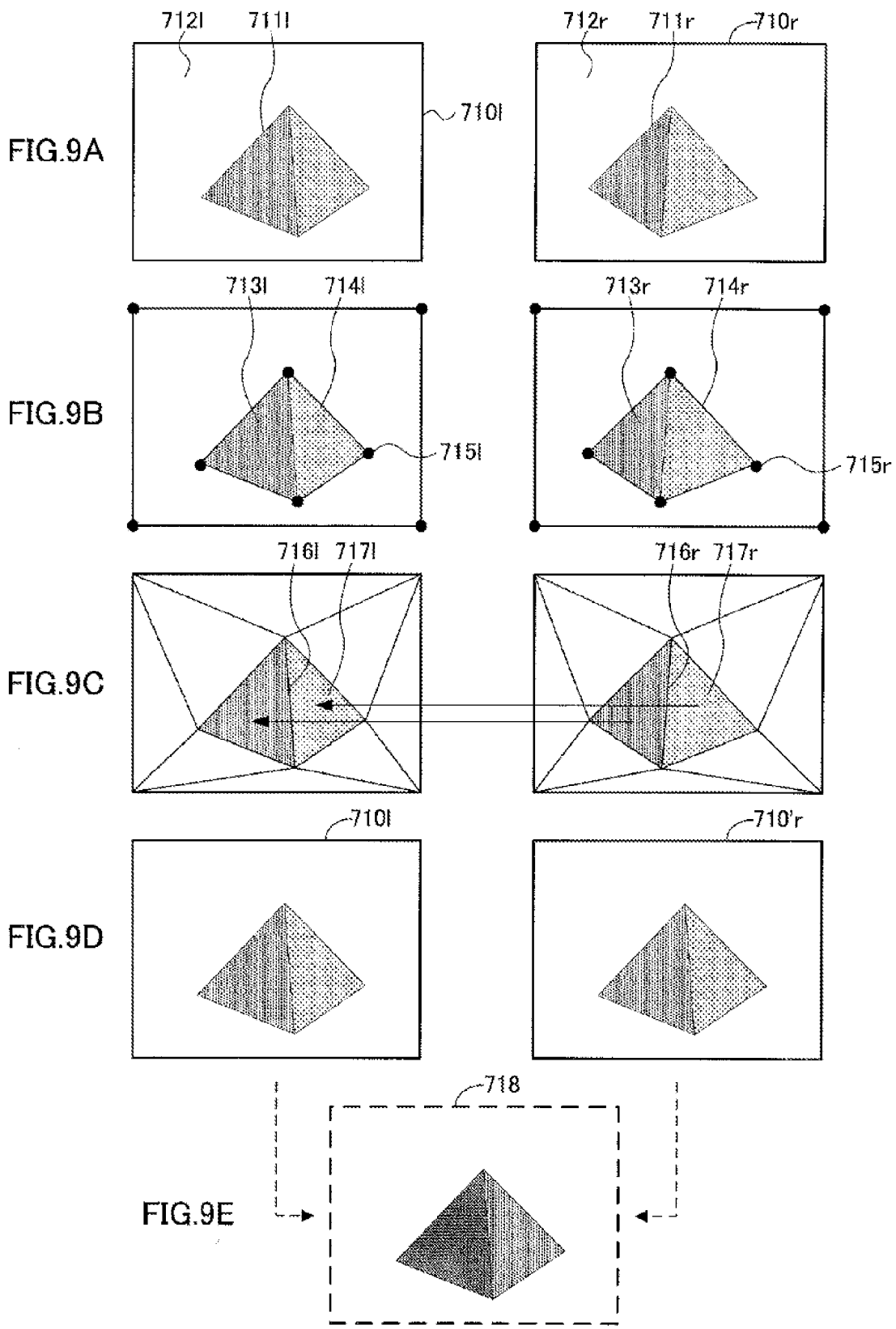
FIG. 9 schematically illustrates the image tuning in Embodiment 2 of the invention.

FIG. 9 schematically illustrates the image tuning in a certain work range.

As illustrated in FIG. 9A, left-eye image 710*l* and right-eye image 710*r* include, for example, pyramidal-object images 711*l* and 711*r* and background images 712*l* and 712*r*, respectively. Although images 711*l* and 711*r* show the same object, their shapes and positions on a plane view are slightly different due to different camera positions.

As illustrated in FIG. 9B, region segmenting section 210 then extracts left-eye segmented image 713*l* and right-eye segmented image 713*r* of the object. Segmented-region feature-point extracting section 220 and image feature-point extracting section 230 then extract a plurality of feature points 715*l* and 715*r* from contours 714*l* and 714*r*, respectively.

As illustrated in FIG. 9C, region mesh generating section 240 then extracts left-eye mesh regions 717*l* and right-eye mesh regions 717*r* defined by boundary lines 716*l* and 716*r* that connect feature points 715*l* and 715*r* to one another, respectively. For example, region deforming section 250 matches the shape of each right-eye mesh region 717*r* to the shape of corresponding left-eye mesh region 717*l* as illustrated by arrows.

Consequently, as illustrated in FIG. 9D, region deforming section 250 matches the positions of each corresponding pixel pair of left-eye image 710*l* and deformed right-eye image 710'*r*. As a result, pixel-value superimposing section 400 can improve the quality of left-eye image 710*l* through subsequent steps to form composite image 718 having, for example, a high contrast as illustrated in FIG. 9E.

Figure 10:
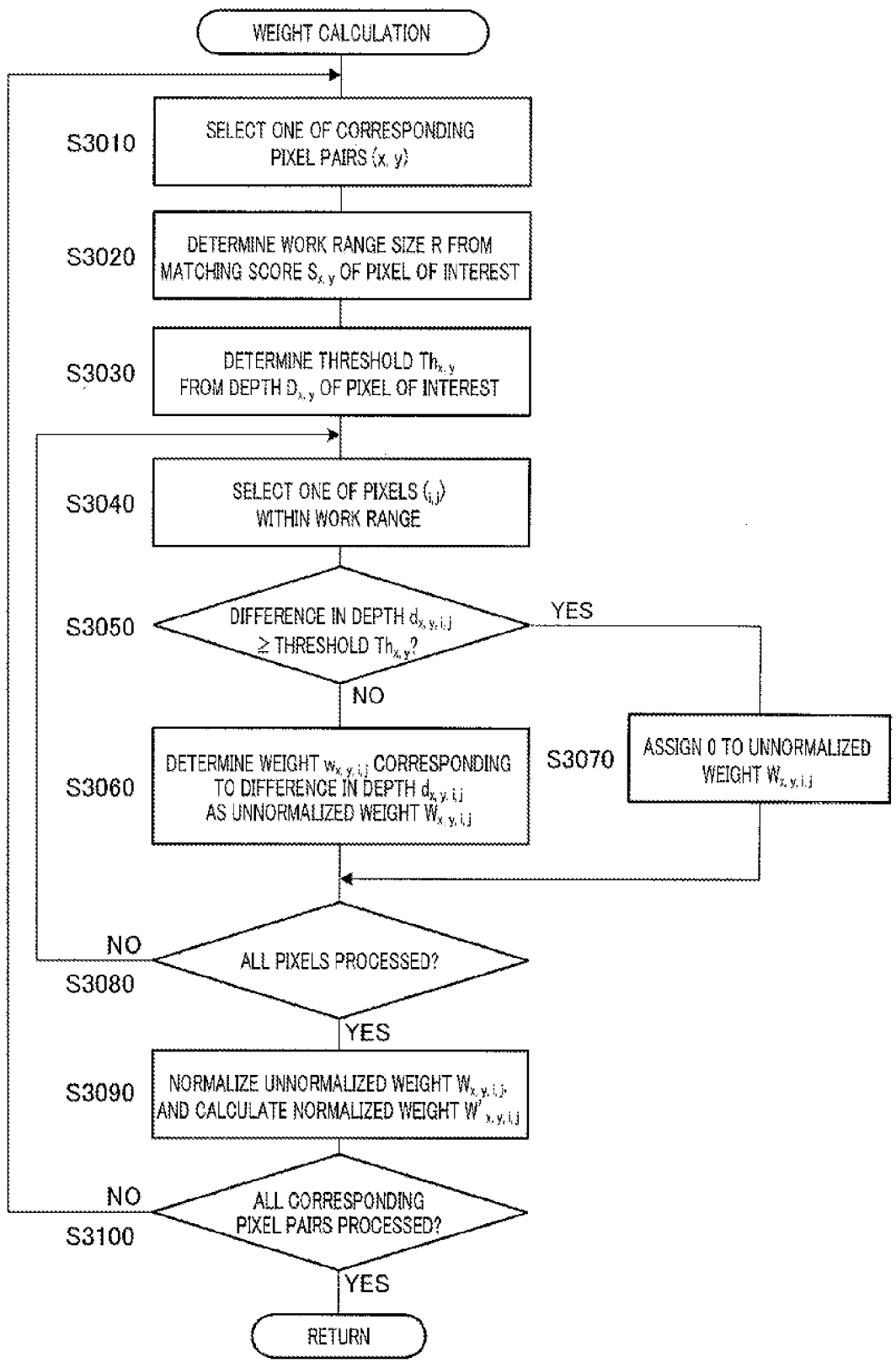
FIG. 10 is a flowchart illustrating exemplary weight calculation in Embodiment 2 of the invention.

FIG. 10 is a flowchart illustrating exemplary weight calculation (step S3000 in FIG. 7).

In step S3010, work range calculating section 260 acquires the matching score and the depth information of each pixel of the left-eye image from image/depth acquiring section 200. Work range calculating section 260 then selects one corresponding pixel pair (represented by coordinates x, y of the left-eye image) from the corresponding pixel pairs indicated by the corresponding pixel pair information.

In step S3020, work range calculating section 260 then determines a work range (work range size) on the basis of matching score $S_{x,y}$ of the pixel of interest.

Work range size R for each corresponding pixel pair can be calculated by, for example, equation 6, where Function g represents the content of the work-range size information.

$$R = g(S_{x,y}) \tag{Equation 6}$$

In step S3030, weight information calculating section 300 determines threshold $Th_{x,y}$ on the basis of depth $D_{x,y}$ of the pixel of interest.

In step S3040, weight information calculating section 300 selects one pixel (represented by position i, j relative to the pixel of interest) from the pixels in the work range.

In step S3050, weight information calculating section 300 determines difference in depth $d_{x,y,i,j}$ between selected pixel (i, j) and pixel of interest (x, y). Weight information calculating section 300 then determines whether or not each resultant difference in depth $d_{x,y,i,j}$ is equal to or larger than threshold $Th_{x,y}$. If difference in depth $d_{x,y,i,j}$ is less than threshold $Th_{x,y}$ (S3050: NO), weight information calculating section 300 performs step S3060: otherwise (S3050: YES), weight information calculating section 300 performs step S3070.

In step S3060, weight information calculating section 300 determines weight $w_{x,y,i,j}$ corresponding to difference in depth $d_{x,y,i,j}$ as unnormalized weight $W_{x,y,i,j}$.

In step S3070, weight information calculating section 300 assigns 0 to unnormalized weight $W_{x,y,i,j}$.

Unnormalized weight $W_{x,y,i,j}$ can be calculated by, for example, equation 7, where Function f represents the content of the weighting information.

(Equation 7)

$$W_{x,y,i,j} = \begin{cases} f(d_{x,y,i,j}) & \text{if } d_{x,y,i,j} < Th_{x,y} \\ 0 & \text{others} \end{cases} \tag{7}$$

In step S3080 in FIG. 10, weight information calculating section 300 determines whether all the pixels (the pixel of interest and the peripheral pixels) in the work range of the selected corresponding pixel pair (x, y) are processed or not. If the pixels are partially processed (S3080: NO), weight information calculating section 300 performs step S3040, and selects an unprocessed pixel. If all the pixels are processed (S3080: YES), weight information calculating section 300 performs step S3090.

In step S3090, weight information calculating section 300 normalizes unnormalized weight $W_{x,y,i,j}$ within the work range, and calculates normalized weight $W'_{x,y,i,j}$.

Normalized weight $W'_{x,y,i,j}$ can be calculated by, for example, equations 8 and 9.

(Equation 8)

$$sum_{x,y} = \sum_{(i,j) \in R} W_{x,y,i,j} \tag{8}$$

(Equation 9)

$$W'_{x,y,i,j} = \frac{W_{x,y,i,j}}{sum_{x,y}} \tag{9}$$

In step S3100, weight information calculating section 300 determines whether all the corresponding pixel pairs are processed or not. If the corresponding pixel pairs are partially processed (S3100: NO), weight information calculating section 300 performs step S3010, and selects an unprocessed corresponding pixel pair. If all the corresponding pixel pairs are processed. (S3100: YES), weight information calculating section 300 performs the process of FIG. 7.

Figure 11:
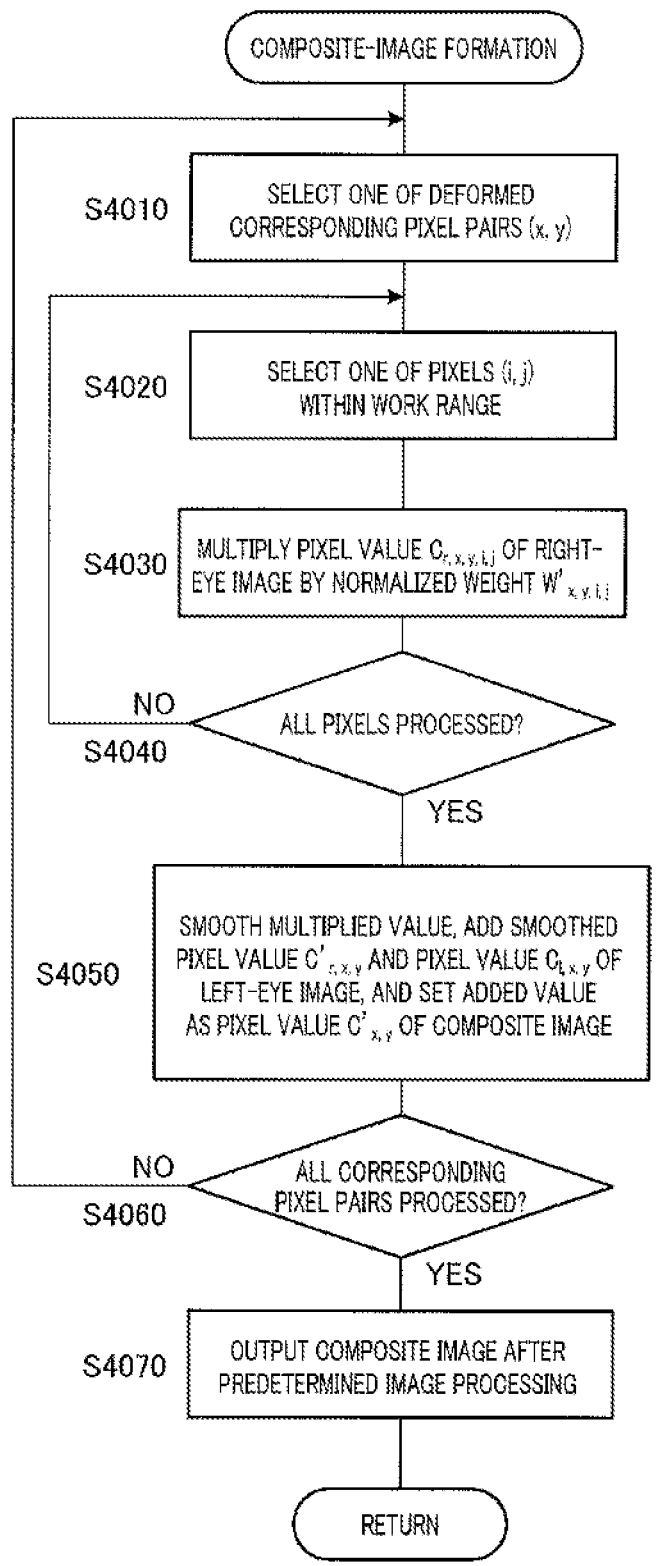
FIG. 11 is a flowchart illustrating exemplary composite-image formation in Embodiment 2 of the invention.

FIG. 11 is a flowchart illustrating exemplary composite-image formation (step S4000 in FIG. 7).

In step S4010, pixel-value superimposing section 400 selects one corresponding pixel pair (represented by coordinates x, y of the left-eye image) from the deformed corresponding pixel pairs indicated by the deformed corresponding pixel pair information.

In step S4020, pixel-value superimposing section 400 selects one pixel (represented by position i, j relative to the pixel of interest) from the pixels in the work range.

In step S4030, pixel-value superimposing section 400 multiplies pixel value $C_{r, x, y, i, j}$ of the selected pixel of the right-eye image by corresponding normalized weight $W'^{x, y, i, j}$.

In step S4040, pixel-value superimposing section 400 determines whether all the pixels (the pixel of interest and the peripheral pixels) in the work range of the selected corresponding pixel pair (x, y) are processed or not. If the pixels are partially processed (S4040: NO), pixel-value superimposing section 400 performs step S4020, and selects an unprocessed pixel. If all the pixels are processed (S4040: YES), pixel-value superimposing section 400 performs step S4050.

In step S4050, pixel-value superimposing section 400 smoothes the multiplied value calculated in step S4030 within the work range. Pixel-value superimposing section 400 adds smoothed pixel value $C'_{r, x, y}$ and pixel value $C_{l, x, y}$ of the left-eye image, and defines the total value as pixel value $C'_{x, y}$ of the composite image.

Pixel value $C'_{x, y}$ of the composite image can be calculated by, for example, equations 10 and 11 using image weights $w'_{l, x, y}$ and $w'_{r, x, y}$.

(Equation 10)

$$C'_{r,x,y} = \sum_{(i,j) \in R} (W'_{x,y,i,j} \cdot C_{r,x,y,i,j}) \quad [10]$$

(Equation 11)

$$C'_{x,y} = w'_{l,x,y} \cdot C_{l,x,y} + w'_{r,x,y} \cdot C'_{r,x,y} \quad [11]$$

Image weights $w'_{l, x, y}$ and $w'_{r, x, y}$ may each be fixed to, for example, 0.5, or may be different among pixels. For example, a certain portion in the background of the left-eye image is occluded in the right-eye image, the portion being outside and near the boundary of the photographed object at the left of an object as the foreground. Hence, for such a portion, pixel-value superimposing section 400 may decrease image weight $w'_{r, x, y}$ of the right-eye image compared with image weight $w'_{l, x, y}$ of the left-eye image. Similarly, for the background outside and near the boundary of the photographed object at the right of the object as the foreground, pixel-value superimposing section 400 may decrease image weight $w'_{l, x, y}$ of the left-eye image compared with image weight $w'_{r, x, y}$ of the right-eye image.

In step S4060, pixel-value superimposing section 400 determines whether all the corresponding pixel pairs are processed or not. If the pixel pairs are partially processed (S4060: NO), pixel-value superimposing section 400 performs step S4010, and selects an unprocessed corresponding pixel pair. If all the corresponding pixel pairs are processed (S4060: YES), pixel-value superimposing section 400 performs step S4070.

In step S4070, color tone/Range adjusting section 410 optionally performs predetermined image processing such as color tone correction of the composite image, and outputs the processed composite image to image display 520 (see FIG. 2) via image outputting section 420. Image processing apparatus 100 then performs the steps of FIG. 7.

Through such operation, image processing apparatus 100 can form the composite image of high quality from a stereo image.

FIG. 12 schematically illustrates calculation of the normalized weight and the smoothed pixel value in a certain work range. The vertical scales in the illustrations are not necessarily identical.

Figure 12A:
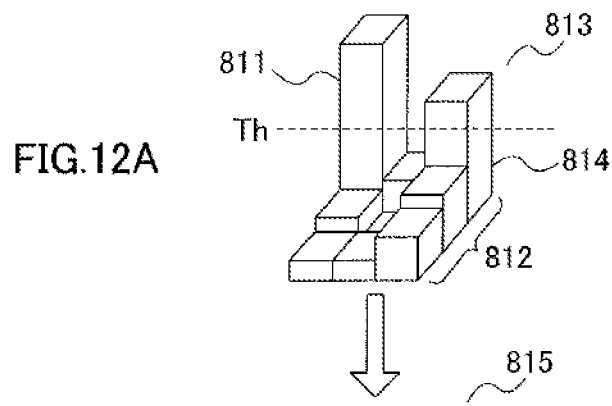
FIG. 12 schematically illustrates calculation of a normalized weight and a smoothed pixel value in Embodiment 2 of the invention.

As illustrated in FIG. 12A, in work range 812 including 3×3 pixels about pixel of interest 811, some of differences in depth 813 of the pixels (for example, the difference in depth of peripheral pixel 814) is assumed to be equal to or higher than threshold Th.

Figure 12B:
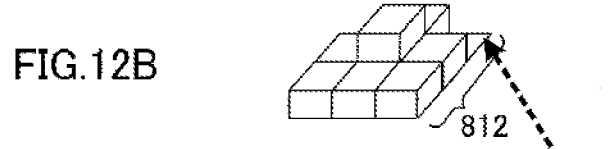
Figure 12C:
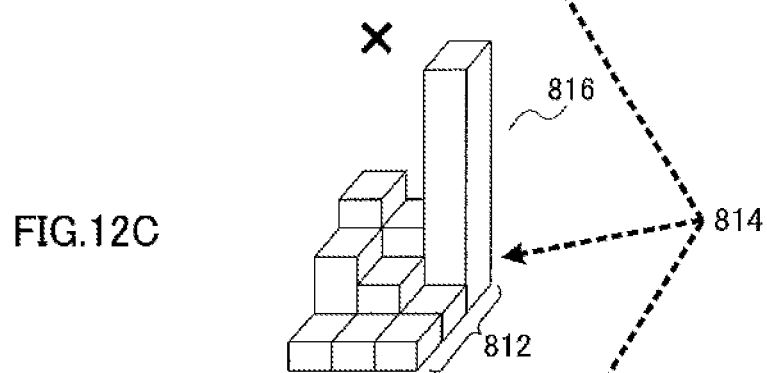
Figure 12D:
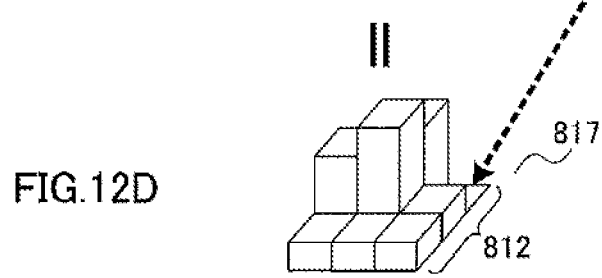

In such a case, the weight of peripheral pixel 814 is cut off to be 0 in normalized weight 815, as illustrated in FIG. 12B. Consequently, even if peripheral pixel 814 has high luminance value 816 as illustrated in FIG. 12C, multiplied value 817 of normalized weight 815 by luminance value 816 is 0 as illustrated in FIG. 12D. For other pixels, higher normalized weight 815 leads to higher multiplied value 817.

Figure 12E:
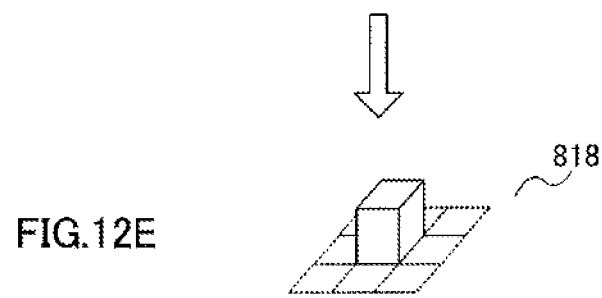

As illustrated in FIG. 12E, the value given by smoothing (addition) of the multiplied values in work range 812 becomes smoothed pixel value 818 of the pixel of interest in work range 812. Specifically, image processing apparatus 100 calculates smoothed pixel value 818 of each pixel while reducing influence of the peripheral pixel having a significantly different depth with respect to the pixel of interest.

In this way, image processing apparatus 100 less weights as difference in depth increases. Consequently, for example, image processing apparatus 100 can smooth the foreground and the background separately in the subsequent stage, which leads to a composite image having a clear boundary of each object.

As described above, image processing apparatus 100 according to Embodiment 2 acquires a stereo image, and weights each pixel on the basis of the depth information prior to smoothing in every work range. Thus, image processing apparatus 100 can separately smooth the interior and the exterior of the boundary of a photographed object with depth information, which reduces blurring of the boundary of the photographed object to expand the dynamic range, achieving an improvement in quality of the photographed image.

Photographic system 500 including image processing apparatus 100 according to Embodiment 2 can photograph a stereo image, can acquire a photographed image of a high quality using the photographed stereo image, and can display the photographed image.

Although the pixel value for every work range (for every deformed corresponding pixel pair) has been smoothed only for the right-eye image in Embodiment 2 described above, the smoothing may also be performed for the left-eye image.

Moreover, although the left-eye image has been used as the reference image, image processing apparatus 100 may deform the left-eye image with the right-eye image as the reference image. Furthermore, the image processing apparatus may deform both the left-eye image and the right-eye image for tuning of the mesh regions.

Moreover, image processing apparatus 100 may form the composite image from a plurality of (three or more) types of images other than the stereo image, as long as depth information of each pixel of the reference image can be acquired from the images. Such images, however, must be simultaneously photographed images of the same object. Hence, for example, image processing apparatus 100 may continuously photograph the same object more than once with a monocular camera, may acquire a depth to each position within an angle of view with a range sensor, and may form a composite image from the plurality of photographed images. Alternatively, image processing apparatus 100 may form a composite image from two images that are simultaneously photographed by two cameras, the cameras having a common photographic range and being arranged in a vertical or oblique direction.

The entire content disclosed in specification, drawings, and abstract included in Japanese Priority Patent Application JP 2011-086736 filed on Apr. 8, 2011 is hereby incorporated by reference.

Industrial Applicability

The image processing apparatus and the image processing method according to the invention can effectively reduce blurring at boundaries of a photographed object, and thus can improve the quality of photographed images.

REFERENCE SIGNS LIST

100 Image processing apparatus
200 Image/depth acquiring section
210 Region segmenting section
220 Segmented-region feature-point extracting section
230 Image feature-point extracting section
240 Region mesh generating section
250 Region deforming section
260 Work range calculating section
300 Weight information calculating section
400 Pixel-value superimposing section
410 Color tone/Range adjusting section
420 Image outputting section
500 Photographic system
510 Stereo camera
520 Image display

The invention claimed is:

1. An image processing apparatus forming a composite image from two photographed images, the image processing apparatus comprising:
an image/depth acquiring section that acquires corresponding pixel pairs between the two images, and depth information and a matching score of every corresponding pixel pair;
a weight information calculating section that determines weights for individual pixels in a predetermined region including a corresponding pixel pair as a pixel of interest on the basis of the depth information and the matching score of every corresponding pixel pair; and
a pixel-value superimposing section that applies the weight to every corresponding pixel pair in the predetermined region for smoothing, replaces the pixel value of the pixel of interest in the predetermined region with the value determined through the smoothing, and superimposes the two images for every pixel, in at least one of the two images.

2. The image processing apparatus according to claim 1, wherein the weight information calculating section less weights the pixel of interest and peripheral pixels other than the pixel of interest in the predetermined region as difference in depth between the depth information of a pixel and the depth information of the pixel of interest increases.

3. The image processing apparatus according to claim 2, further comprising a work range calculating section that determines the predetermined region to be wider as the matching score of a corresponding pixel pair decreases, for each of the corresponding pixel pairs.

4. The image processing apparatus according to claim 3, wherein the weight information calculating section determines the weight such that the sum total of the weights at every corresponding pixel pair in the predetermined region is constant.

5. The image processing apparatus according to claim 4, wherein:
the work range calculating section determines a toroidal region centering on the pixel of interest as the predetermined region, and
the weight information calculating section assigns 0 to the weight of the peripheral pixel having a difference in depth equal to or larger than a predetermined threshold.

6. The image processing apparatus according to claim 5, wherein the predetermined threshold used in the weight information calculating section has a lower value as depth of the pixel of interest decreases.

7. The image processing apparatus according to claim 6, further comprising:
a region segmenting section that acquires the corresponding image region pairs between the two images; and
a region deforming section that matches the shapes of the regions of the composite image for each of the corresponding image region pairs.

8. The image processing apparatus according to claim 1, wherein the two images are a left-eye image and a right-eye image formed from a stereo image.

9. An image processing method for forming a composite image from two photographed images, the method comprising the steps of:
acquiring corresponding pixel pairs between the two images, and acquiring depth information and a matching score of each of the corresponding pixel pairs;
determining weights for individual pixels in a predetermined region including a corresponding pixel pair as a pixel of interest on the basis of the depth information and the matching score of every the corresponding pixel pair; and
applying the weight to a pixel value in the predetermined region for smoothing for every corresponding pixel pair, replacing the pixel value of the pixel of interest in the predetermined region with the value determined through the smoothing, and superimposing the two images for every pixel, in at least one of the two images.

* * * * *